UNITED STATES PATENT OFFICE.

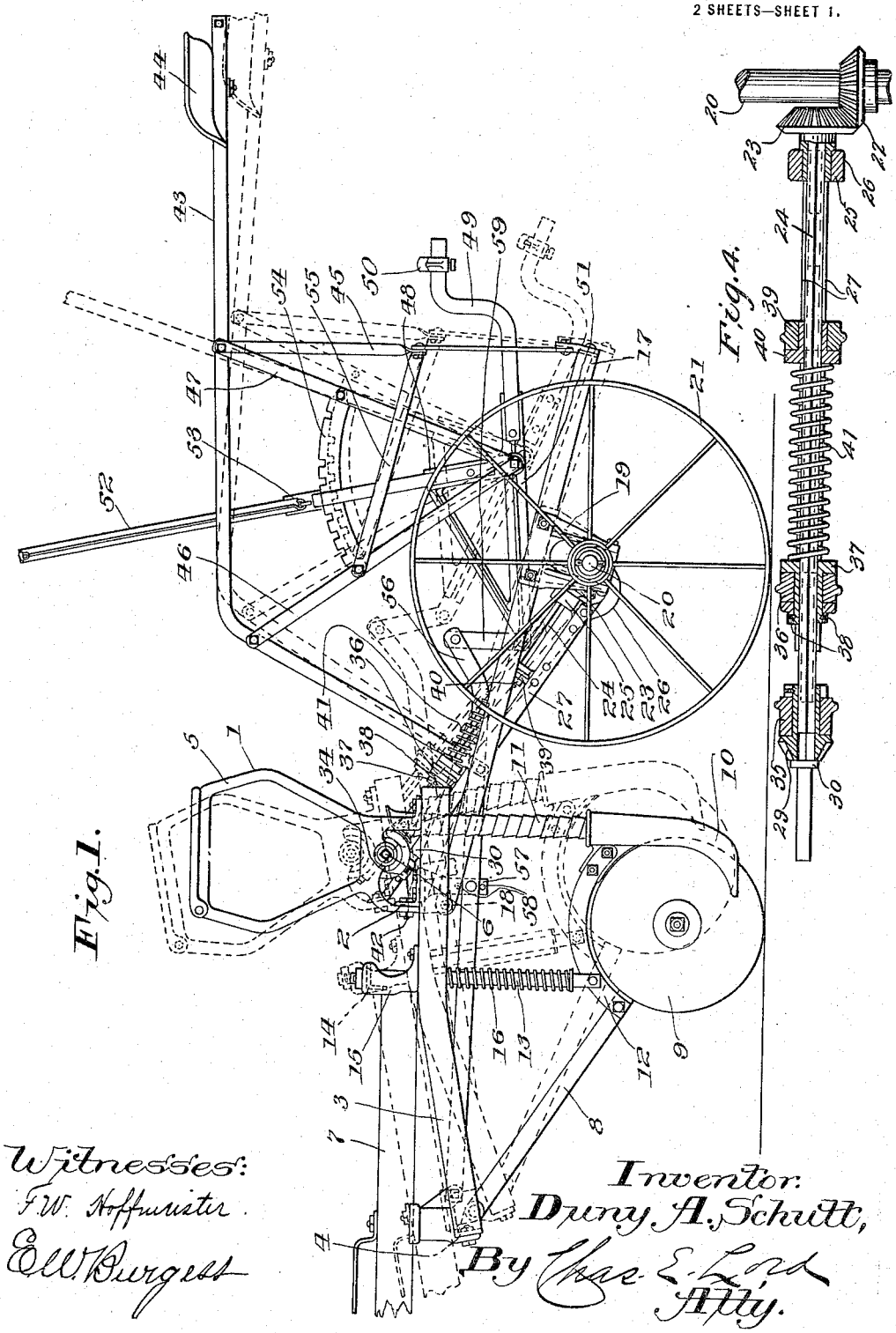

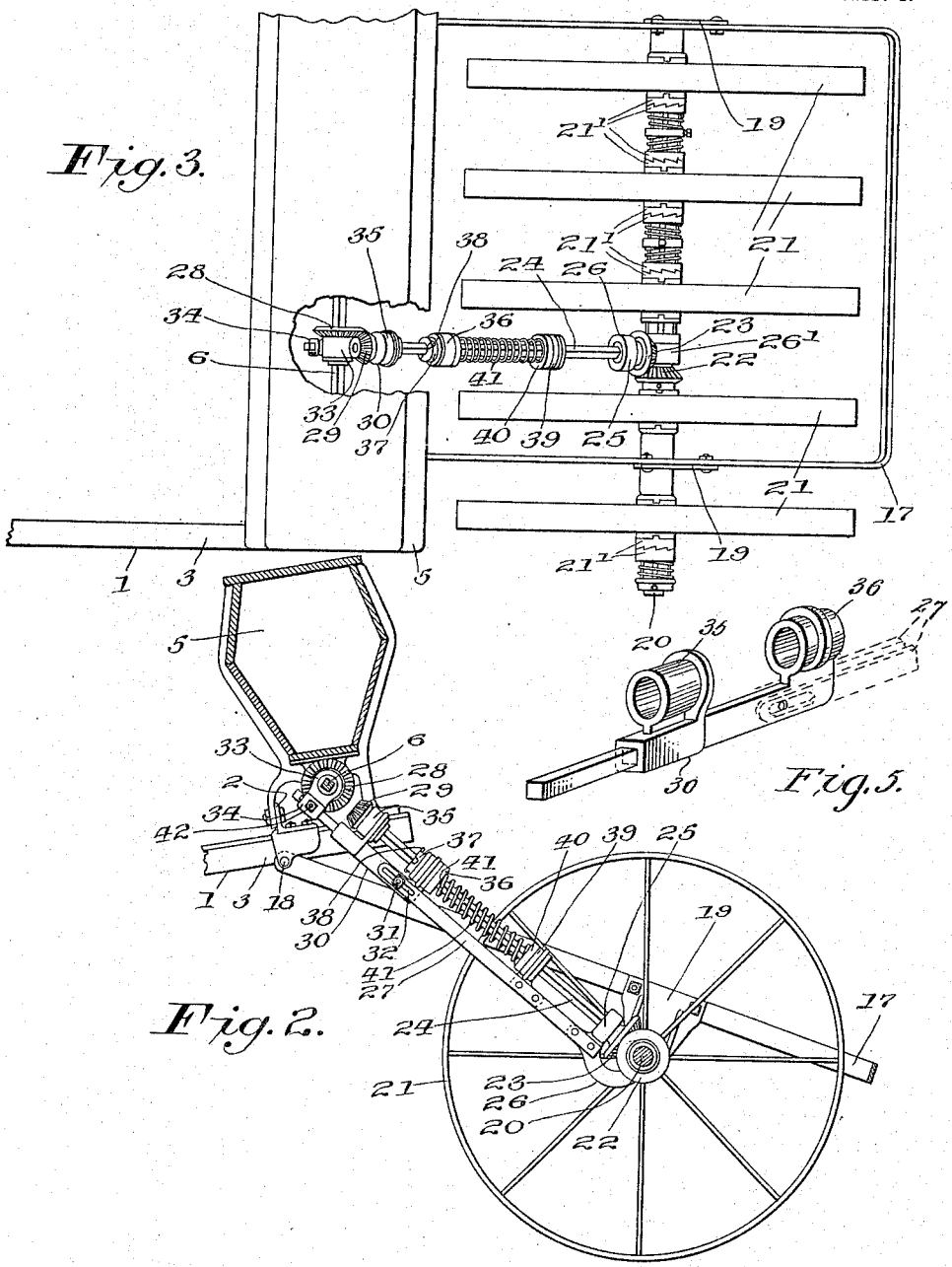

DUNY A. SCHUTT, OF CHICAGO, ILLINOIS, ASSIGNOR TO INTERNATIONAL HARVESTER COMPANY OF NEW JERSEY, A CORPORATION OF NEW JERSEY.

GRAIN-DRILL.

1,226,707.  Specification of Letters Patent.  Patented May 22, 1917.

Application filed November 3, 1913. Serial No. 798,820.

*To all whom it may concern:*

Be it known that I, DUNY A. SCHUTT, a citizen of the United States, residing at Chicago, in the county of Cook and State of Illinois, have invented certain new and useful Improvements in Grain-Drills, of which the following is a full, clear, and exact specification.

My invention relates to grain drills in its general adaptation, and is particularly applicable for use in connection with what is commonly called the presser wheel type of that class of machines, and consists in providing improved power transmitting mechanism between the presser wheel shaft and the seed distributing mechanism. The object of my invention is to provide a simple form of spring-controlled clutch mechanism that is automatic and efficient in its operation. These objects are attained by means of mechanism, one embodiment of which is illustrated in the accompanying drawings, in which—

Figure 1 is a side elevation of a grain drill having my invention embodied in its construction;

Fig. 2 is a detached part of Fig. 1 and designed to illustrate the construction of the clutch mechanism;

Fig. 3 is a top plan view of Fig. 2.

Fig. 4 shows a longitudinal central sectional view of the drive shaft and associated parts.

Fig. 5 shows a detail perspective view of the mounting between the drill shaft and drive shaft.

The same reference characters designate like parts throughout the several views.

1 represents the frame of a grain drill including a transversely arranged bar 2 near the rear side of the machine, having its opposite ends secured to side members 3 in a common way, and 4 represents a front transverse member of the frame. 5 represents a seed box mounted upon the frame and having a seed distributing shaft 6 journaled at the bottom thereof, and 7 represents a draft tongue secured to the frame of the machine. 8 represents one of a series of drag bars having its front end pivotally connected with the front member 4 of the frame structure, and having at its rear end a furrow opening disk 9 and a seed conducting boot 10. 11 represents a seed conducting tube connecting the boot with the seed box. The boot is connected with the drag bar by means of an arch-shaped member 12, and 13 represents a link having its lower end pivotally connected with the member 12 and its upper end slidably received by an opening in a transversely disposed bar 14 secured to the side members of the frame of the machine by means of bracket members 15, and 16 represents the usual pressure springs carried by the links and operative in a well-known way to yieldingly hold the disks in operative position in forming a furrow in advance of the seed conducting boot; all the parts heretofore mentioned being common in this class of machines. 17 represents a presser wheel frame having a U-shaped form, with the front ends of its side members pivotally connected at 18 with the frame of the grain drill. 19 represents bracket members secured to the side members of the frame 17 and having an axle 20 journaled therein, and mounted upon the axle are a series of presser wheels 21 that trail in rear of the seed conducting boots 10 in a well-known way; the wheels being operatively connected with the axle 20 by means of spring-pressed clutch members $21^1$ having a common form. 22 represents a bevel pinion secured to the axle 20 and meshing with a like pinion 23 secured to the rear end of a downwardly and rearwardly inclined angular shaft 24, having its rear end journaled in a bearing box 25 carried by a bracket member 26 having a sleeve $26^1$ loosely mounted upon the axle 20. 27 represents one of two bars that are spaced apart and have their rear ends secured to the front end of the bracket member 26. 28 represents a bevel pinion carried by the seed distributing shaft 6 and adapted to mesh with a pinion 29 secured to the front upper end of the shaft 24. 30 represents a journal supporting member having its rear end slidably received between the spaced bars 27 and secured by a bolt 31 that moves in longitudinally disposed slots 32 at the front ends of the spaced bars 27. The front end of the member 30 is angular in cross section and is adjustably received by a sleeve member 34 forming part of a bracket member 33 that is loosely mounted upon the seed distributing shaft 6. 35 represents a journal carrying member forming part of the member 30 intermediate its ends and in which the hub of the pinion 29 is journaled, and 36 represents a second journal carrying member forming part of the rear end of the member 30 and having a sleeve member 37 journaled therein, the sleeve being secured against endwise movement relative to the member 36 by means of screws 38. 39 represents a third journal carrying member secured between the spaced bars 27, and near their lower ends, and having a sleeve member 40 that is carried by the shaft 24 journaled therein, and 41 represents a compression spring encircling the shaft 24 and operative between journal carrying members 36 and 39. 42 represents a set screw operative to secure the front end of the member 30 in any desired position of adjustment in the sleeve member 33. 43 represents a seat supporting frame having a horizontally disposed rear member upon which is mounted a seat 44. The front end of the frame inclines downward and forward and is secured to the side members of the presser wheel frame 17, the rear end of the frame being supported by means of bars 45, having their upper ends secured to the frame 43 and their lower ends to the rear side of the frame 17. 46 and 47 represent front and rear members, respectively, of a lever supporting frame, having their upper ends secured to the inclined and horizontal parts of the seat supporting frame, respectively, and converging to a common point at their lower ends and forming, with the seat supporting bars, a triangular frame, at the lower end of which is pivotally mounted a lever bracket 48, comprising a rearwardly upturned extension 49 having a foot receiving member 50 adjustably mounted thereon, and a forwardly extending triangular member 51, to the vertical side 48 of which is secured a hand lever 52, having a detent mechanism 53 that engages with a notched sector 54 concentric with the axis of lever bracket 48, the ends of the sector being secured to the bars 46 and 47, and 55 represents an additional frame member having one end secured to the bar 46 and its opposite end to the bar 45. 56 represents a bar pivoted intermediate its ends to a depending member 57 secured to the frame of the grain drill and provided with a series of vertically arranged openings 58 whereby the fulcrum of the bar may be adjusted from a lower to a higher plane, the front end of the bar being pivotally connected with the front of the grain drill frame, and its rear upturned end with the front end of the triangular member 51 of the lever 48 by means of a link 59.

In operation the grain drill frame 1 turns about the pivotal connection of the side members of the presser frame 17, the presser frame upon the axis of its wheels. To raise the disks 9 from the ground the operator swings the hand lever 52 rearward, such movement being assisted, if necessary by a pressure of the foot upon the extension 49.

The triangular member 51, through the link connection with the bar 56, then raises the frame 1 carrying the furrow openers with it. An essential element of my invention is the means for automatically disconnecting the pinion 29 from the pinion 28 for the purpose of suspending the operation of the seed distributing mechanism when the furrow opening disks are raised from the ground. The axis of the pivotal connection between the frames 1 and 17 being below and eccentric with the axis of the seed distributing shaft 6, causes the pinion 29 to move out of mesh with pinion 28 when the frames are tilted about their axes in an upward direction, and to move into mesh when the frames are tilted in an opposite direction, and should the two pinions fail to mesh properly when brought together, the spring 41 will yield and permit the journal supporting member 30 to slide between the spaced bars 27 in a manner to contract the effective length of the combined parts 27 and 30 as a unit, and when the shaft 24 rotates sufficient to allow the pinions to engage, the spring automatically restores the parts 27 and 30 to their proper operative length, bringing the two pinions in mesh with each other.

Having shown one embodiment of my invention, it is understood that minor changes may be made therein without departing from the spirit of my invention.

What I claim as my invention, and desire to secure by Letters Patent, is:

1. In combination, pivotally connected front and rear frames, a shaft journaled upon the front frame with its axis eccentric to the pivotal connection of the frames, a shaft journaled upon the rear frame, a driving connection of fixed length between said shafts, and an extensible supporting member for said driving connection.

2. In combination, pivotally connected front and rear frames, a shaft journaled upon the front frame with its axis eccentric to the pivotal connection of the frames, a shaft journaled upon the rear frame, a driving connection of fixed length between said shafts, and a contractile supporting member for said driving connection.

3. In combination, pivotally connected front and rear frames, a shaft journaled upon the front frame with its axis eccentric to the pivotal connection of the frames, a shaft journaled upon the rear frame, a driving connection of fixed length between said shafts, and an extensible and contractile supporting member for said driving connection.

4. A grain drill comprising, in combination, front and rear frames having pivotal connection, a seed distributing shaft journaled upon the front frame and having its axis eccentric to that of the pivotal connection of the frames, a rotatable shaft journaled upon the rear frame, a longitudinally extensible and contractile supporting member connected to said shafts, and a driving shaft for said shafts journaled on said supporting member.

5. A grain drill comprising, in combination, front and rear frames having pivotal connection, a seed distributing shaft journaled upon the front frame and having its axis eccentric to that of the pivotal connection of the frames, a rotatable shaft journaled upon the rear frame, a longitudinally contractile and extensible supporting member having its opposite ends loosely mounted upon said shaft, gears on said shafts, and a gear driving member engaging said gears and journaled on said supporting member.

6. A grain drill comprising, in combination, front and rear frames having pivotal connection, a seed distributing shaft journaled upon the front frame and having its axis eccentric to that of the pivotal connection of the frames, a rotatable shaft journaled upon the rear frame, and a two-part journal supporting bar having its opposite ends loosely mounted upon said shafts, the two parts of said bar being slidably connected longitudinally.

7. A grain drill comprising, in combination, front and rear frames having pivotal connection, a seed distributing shaft journaled upon the front frame and having its axis eccentric to that of the pivotal connection of the frame, a rotatable shaft journaled upon the rear frame, a two-part journal supporting bar having its opposite ends loosely mounted upon said shafts, the two parts of said bar being slidably connected longitudinally, and a spring operative to normally extend the effective length of said bar.

8. A grain drill comprising, in combination, front and rear frames having pivotal connection, a seed distributing shaft journaled upon the front frame and having its axis eccentric to that of the pivotal connection of the frame, a rotatable shaft journaled upon the rear frame, a pinion secured to said shaft, a pinion secured to the seed distributing shaft, a journal carrying member having its opposite ends loosely mounted upon said shafts, a shaft journaled upon said carrying member, pinions secured to opposite ends of said shaft and engaging with said first mentioned pinions, said journal carrying member being longitudinally extensible and contractile, and a spring encircling the shaft journaled upon said carrying member and operative to normally extend said carrying member.

9. A grain drill having, in combination, front and rear frames pivotally connected, a seed distributing shaft journaled upon the front frame eccentric to the axis of the pivotal connection of the two frames, a presser wheel mechanism carried by the rear frame including a rotatable axle, a pinion secured to said axle, a pinion secured to said seed distributing shaft, an inclined shaft having pinions secured to opposite ends thereof and adapted to engage with said first mentioned pinion, and a longitudinally yielding support for said inclined shaft operatively connected to said distributing shaft and to said axle.

10. A grain drill having, in combination, front and rear frames having pivotal connection, furrow opening disks carried by said front frame, a presser wheel mechanism mounted upon said rear frame, and means for raising or lowering said front frame relative to said rear frame, said means including a longitudinally disposed bar having its front end pivotally connected with the front side of the front frame, its middle part with said frame near its rear side, and its rear end with a hand lever mechanism carried by the rear frame.

11. A grain drill having, in combination, front and rear frames having pivotal connection, furrow opening disks carried by said front frame, a presser wheel mechanism carried by said rear frame, means for raising or lowering said front frame relative to said presser wheel frame, said means including a combined foot and hand lever pivotally mounted upon said rear frame, a detent and sector mechanism operative to retain said lever in adjusted position, said lever having a forwardly projecting arm, a longitudinally disposed bar having its front end pivotally connected with the front side of the front frame, its middle part with said frame near its rear side, and its rear end turned upward, and a link connection between said upturned end and the front end of said forwardly projecting arm.

12. A grain drill having, in combination, front and rear frames having pivotal connection, said rear frame including a raised seat supporting frame, furrow opening disks carried by said front frame, a presser wheel mechanism carried by said rear frame, means for raising or lowering said front frame relative to said rear frame, said means including a combined hand and foot lever, a depending triangular frame carried by said supporting frame, having said lever pivotally mounted upon its lower end, a notched sector secured to said triangular frame, a detent mechanism carried by said lever and adapted to engage with said sector, said lever having a forwardly projecting arm, a longitudinally disposed bar having its front end connected with the front side of the front frame and its middle part pivotally connected with said frame near the rear side thereof and adjustable vertically and having its rear end turned upward, and a link connection between said upturned end and the front end of said forwardly projecting arm.

13. In a grain drill, a supporting frame provided with a transverse shaft carrying presser wheels, a front frame pivoted on the supporting frame and carrying seeding and earth-working devices, a drive shaft operatively connected between the transverse shaft and seeding devices, means including a lever for adjusting the angular positions of the frames, and means automatically disconnecting said drive shaft from the seeding devices when the frames are angled to raise the earth-working devices.

14. In a grain drill, a supporting frame provided with a transverse shaft carrying presser wheels, a frame pivoted forwardly of said supporting frame and carrying seeding devices and earth-working tools, a drive shaft extending forwardly operatively connected with the transverse shaft and having a gear connection with said seeding devices, means including a lever for adjusting the angular positions of said frames, and means automatically disconnecting said gears when the frames are angled to raise the earth-working tools.

15. In a grain drill, a supporting frame provided with a transverse shaft carrying presser wheels, a frame pivoted forwardly of said supporting frame and carrying a feed shaft and earth-working tools, said feed shaft being arranged out of line of the pivot points of said frames, a drive shaft connecting said feed shaft and transverse shaft, and means including a frame adjusting lever for raising and lowering the front frame and earth-working tools in a manner to disconnect the feed shaft from the drive shaft.

In testimony whereof I affix my signature, in the presence of two witnesses.

DUNY A. SCHUTT.

Witnesses:
F. W. HOFFMEISTER,
H. L. SHARP.

Copies of this patent may be obtained for five cents each, by addressing the "Commissioner of Patents, Washington, D. C."